Dec. 10, 1963   R. C. K. LEE   3,113,749
AIRCRAFT AUTOMATIC CONTROL APPARATUS
Filed Dec. 15, 1960   4 Sheets-Sheet 1
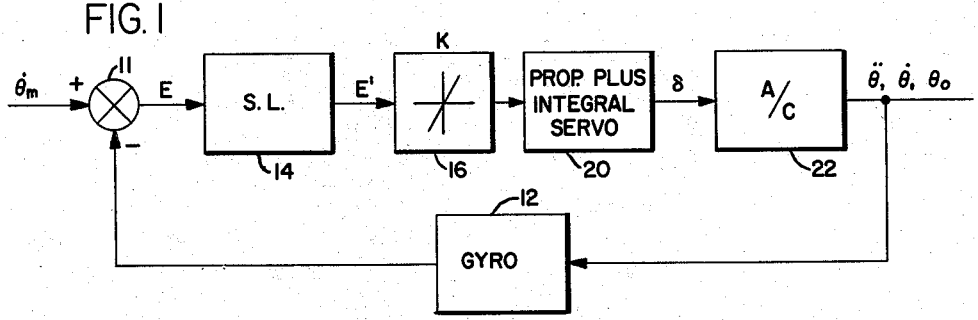
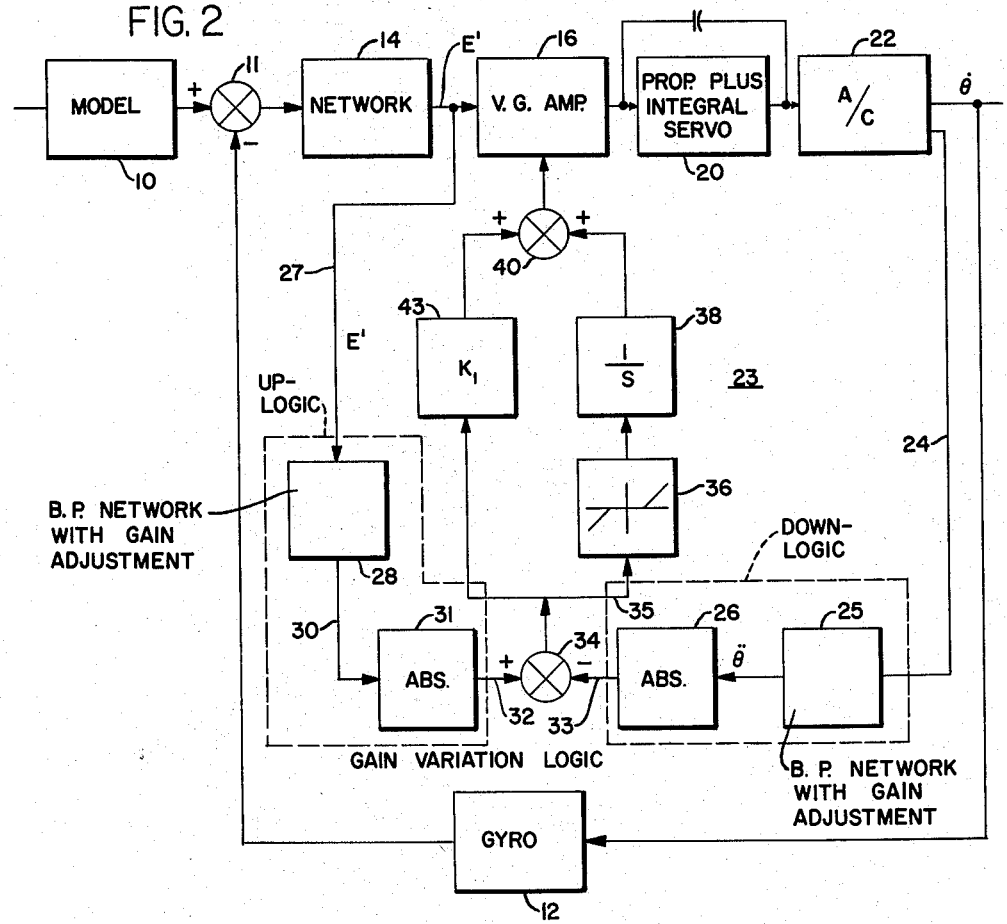
INVENTOR
R. C. K. LEE
BY
ATTORNEY

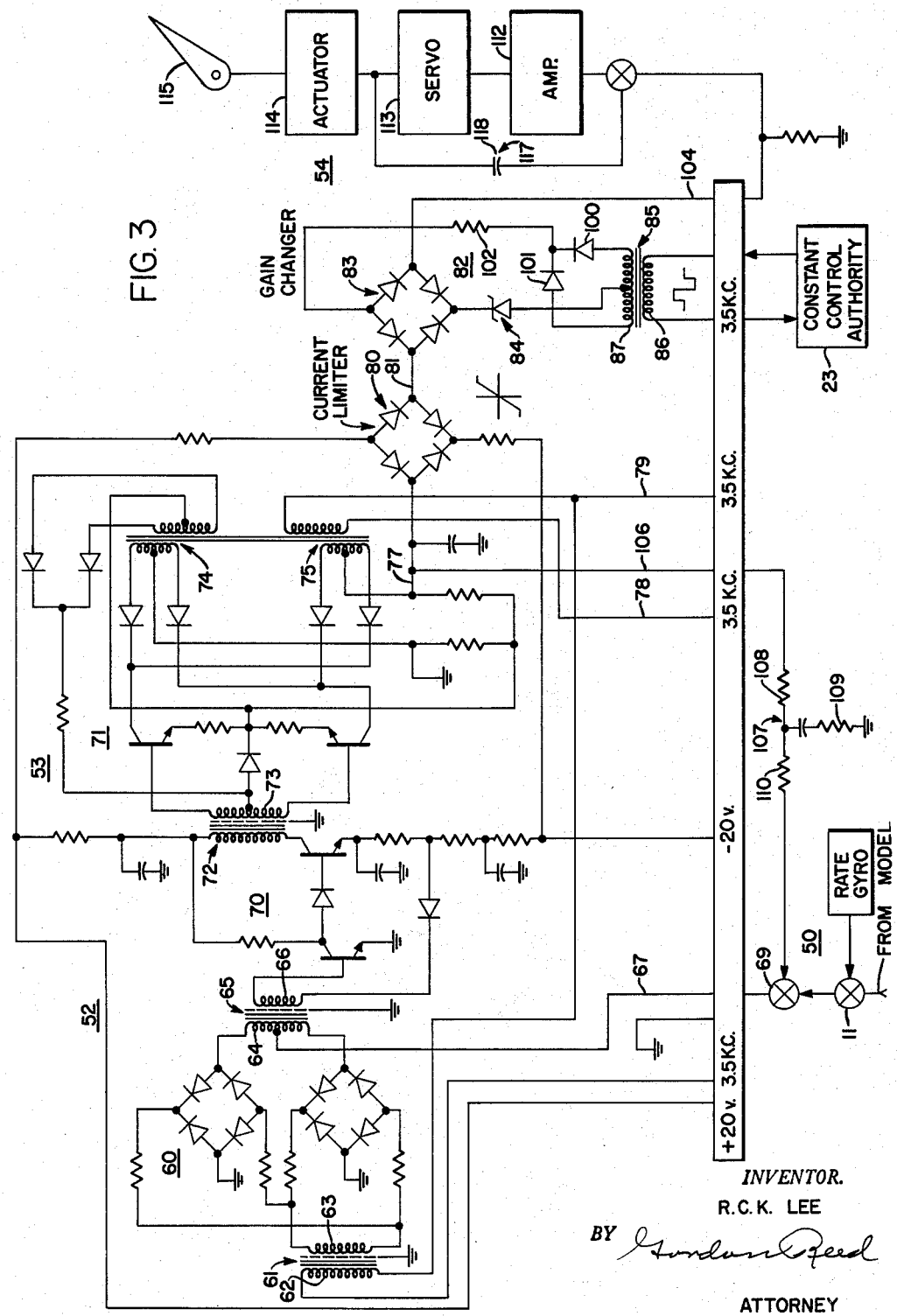

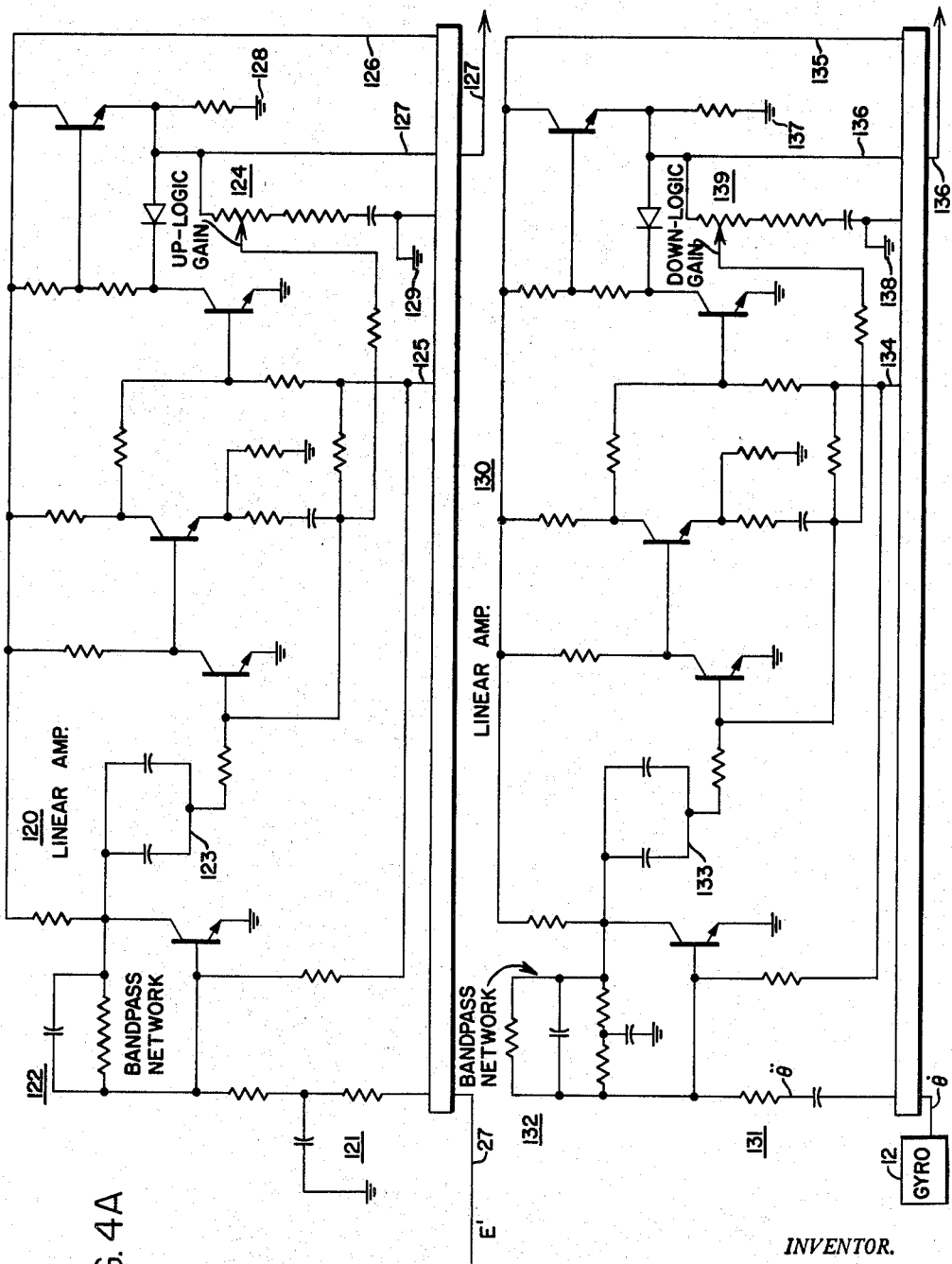

INVENTOR.
R. C. K. LEE

United States Patent Office 3,113,749
Patented Dec. 10, 1963

3,113,749
AIRCRAFT AUTOMATIC CONTROL APPARATUS
Robert C. K. Lee, Fridley, Minn., assignor to Minneapolis-Honeywell Regulator Company, Minneapolis, Minn., a corporation of Delaware
Filed Dec. 15, 1960, Ser. No. 75,954
15 Claims. (Cl. 244—77)

This invention relates to condition control apparatus and more particularly to improved flight condition control apparatus for an aircraft. Furthermore, the flight control apparatus herein is of the self-adaptive or self-adjusting type which senses its own performance relative to a desired performance and thus resembles in a general way, the self-adaptive automatic pilot for an aircraft disclosed in my prior joint U.S. Patent 3,030,054 with Anders Ljungwe, dated April 17, 1962, and also that disclosed in a prior Patent 3,057,584 of Remus Bretoi dated October 9, 1962. The improvement herein can provide substantially the same performance in aircraft as provided by the prior control system in the Bretoi patent without the existence of a limit cycle.

The above self-adaptive automatic flight control systems utilize a model which is a constant parameter network with a transfer function corresponding to the desired control system-aircraft response. The model is a simple simulation of an ideal airplane which, for illustration, is taken as having a natural frequency of three (3) radians per second and a damping ratio of 0.7 in the pitch axis.

The remainder of the self-adaptive automatic flight control apparatus in the aircraft acts in a manner to cause the aircraft response to be the same as the model response. If the closed loop transfer function of the remainder of the self adaptive automatic flight control apparatus were unity (infinite gain system), then the airplane response would be equal to the model response. In the prior system of my joint patent the adaptive control was essentially an on-off amplifier device which commanded a finite aircraft control surface rate which is either in a positive or a negative direction, but of a given magnitude. In the prior system the surface rate therein is constant because the amplifier saturates for small signals. It is evident that for such small error signals the gain of the adaptive system considered in terms of surface rate is high whereas for large error signals the gain of the system is comparably low since the surface rate is the same. Consequently, a steady-state motion of the system including the control surface at a characteristic frequency resulted. This characteristic frequency termed a limit cycle frequency in the previous system while very small in amplitude and apparently below the threshold of aircraft pilot perception, is nevertheless an undesired but unavoidable system operation caused by operating near the instability point of the adaptive system-aircraft which the present invention tends to avoid by utilizing a new approach.

An object therefore of the present invention is to provide a novel self-adaptive automatic control apparatus which adjusts its operation to various flight conditions by maintaining a substantially constant gain margin.

A further object of this invention is to provide a self-adaptive automatic control apparatus having constant control authority wherein a limit cycle present in earlier adaptive systems has been substantially eliminated by operating the apparatus at selected proportions or percentages of the critical gain.

A further object of this invention is to provide a novel linear gain changing arrangement using special frequency sensitive circuits in a self-adaptive automatic control system to provide constant control authority to reduce limit cycle oscillations.

A further object of this invention is to provide a self-adaptive automatic control system in an aircraft wherein the gain of the system is automatically altered to provide substantially constant control authority or ratio between a control signal and an aircraft response thereto or which seeks to maintain a constant ratio between craft response and the control signal effecting craft response.

The above and further objects and advantages of the invention will become apparent upon references to the following specification taken in conjunction with the accompanying drawings wherein is disclosed one embodiment of the concept of my invention.

Referring to the drawings, FIGURE 1 in block form shows a simple aircraft pitch rate control system;

FIGURE 2 shows in block form the elements of my self-adaptive control system utilizing a selective variable gain changer over the arrangement of FIGURE 1;

FIGURE 3 is an electric schematic of the system with a novel gain changer in block form; and FIGURES 4A and 4B together show a mechanical-electric schematic of an embodiment of the novel gain changer termed a constant control authority.

Figure 4B:
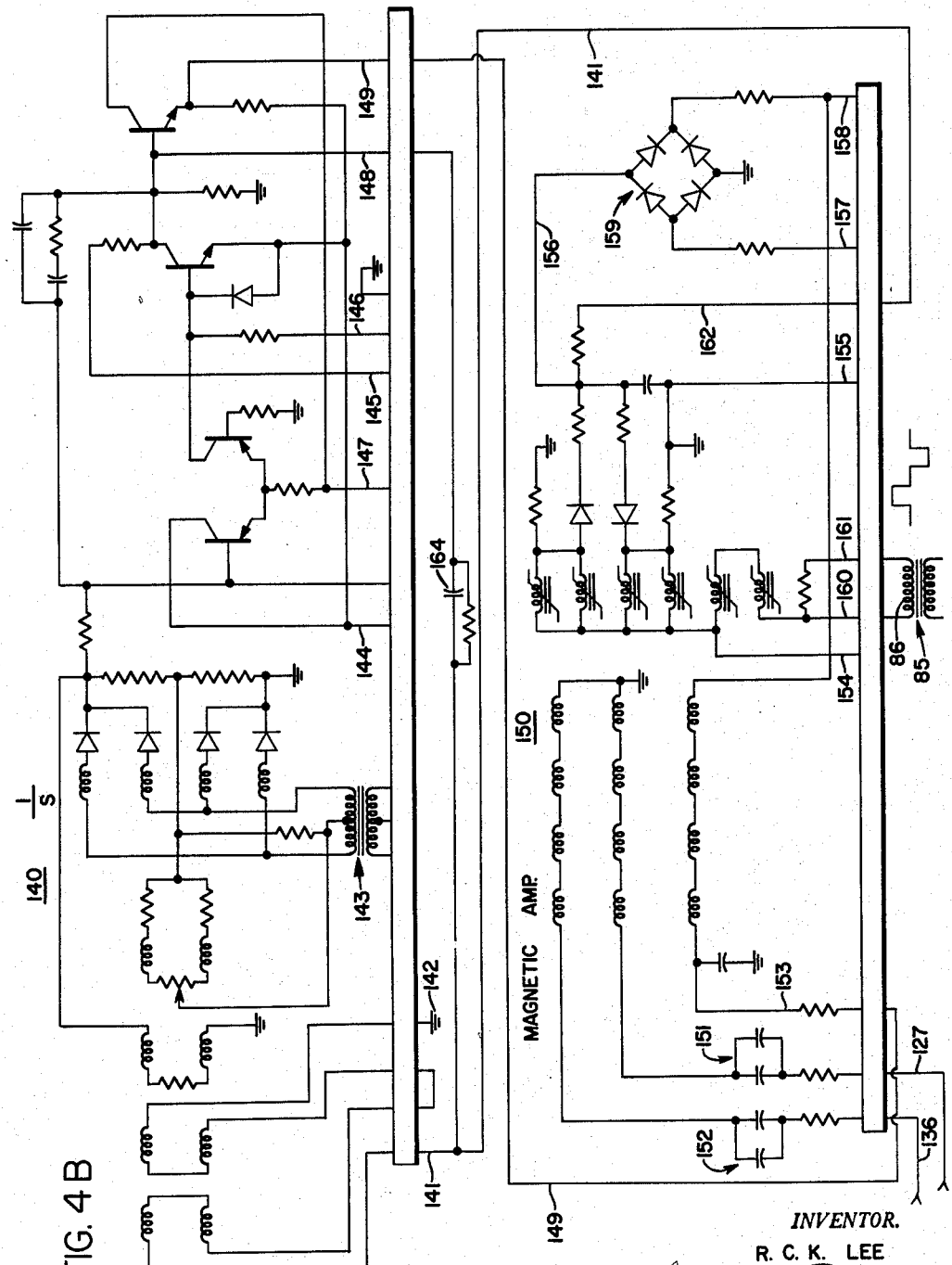

Referring to FIGURE 1, in considering the system operation, a command pitch rate which in the adaptive system is the output ($\theta$M) of a model, having a second order response therein, is summed at point 11 with the aircraft pitch rate sensed by a rate gyro 12 to supply an error signal (E). This error signal is applied to a system logic (s. L.) 14 which may be a network having the transfer function $$\frac{K(Ts+1)}{KTs+1}$$

The output from the network 14 is a quantity (E') which is applied to a linear amplifier 16 having a variable gain (K). The amplifier 16 in turn controls a proportional plus integral servo 20. The servo 20 has a transfer function $$\frac{1+Ts}{s}$$

The servomotor in turn positions an elevator surface on aircraft 22 an angular amount ($\delta$) to control the aircraft. The aircraft because of the moment derived from the displaced surface in turn has an angular acceleration $\ddot{\theta}$, a pitch rate $\dot{\theta}$, and an attitude change $\theta$.

Using a generalized simplified pitch axis equation of motion of the aircraft the relationship between craft pitch rate $\dot{\theta}$ and elevator displacement is:

(1) $$\frac{\dot{\theta}}{-\delta_e} = \frac{-M\delta_e}{Ta} \cdot \frac{1+Tas}{s^2+2\zeta_n\omega_n s+\omega_n^2}$$

Through a suitable manipulation, the craft angular acceleration $\ddot{\theta}$ is:

(2) $$\frac{\ddot{\theta}}{-\delta_e} = \frac{-M\delta_e}{Ta\omega_n^2} \cdot \frac{(1+Tas)s}{\frac{s^2}{\omega_n^2}+\frac{2\zeta s}{\omega_m}+1}$$

Also, the open loop transfer function between the quantity E' and elevator deflection $\delta_e$ is:

(3) $$-\frac{\delta_e}{E'} = K\left[\frac{1+Ts}{s}\right]$$

$T$ = time constant of the servo.

Then at high frequency:

$$\frac{\ddot{\theta}}{E'} \sim KTM\delta_e$$

where T is a constant. Therefore to maintain constant control authority at high frequency (or at the time now basis)

$$\frac{\ddot{\theta}}{E'} = \text{constant} = KTM\delta_e = K'$$

Further, the constant $K'$ could be set such that the system is stable. A simple discriminating criterion could be as follows:

$$|K'E'| - |\dot{\theta}| = \xi = 0$$

where:
$\xi = +$ increase gain
$\xi = -$ decrease gain

In the above mathematic expressions, $\ddot{\theta}$ is the aircraft angular acceleration, $\dot{\theta}$ is the craft pitch rate, $\delta_e$ is the elevator deflection, $M\delta_e$ is the elevator surface effectiveness, $Ta$ is the time constant of the aircraft and involved with the response of the aircraft to elevator deflection, $\omega_n$ is the natural frequency of the aircraft, $\zeta$ is the damping ratio, and $s$ is the conventional mathematical operator in the La Place notation, $K$ is the gain of the linear amplifier 16, and $T$ is the proportional gain of the servo 20 which in the frequency domain is considered a time constant.

By multiplying Equation 2 by Equation 3 and then at high frequency we obtain:

(4) $$\frac{\ddot{\theta}}{E'} \simeq KTM\delta_e$$

At high frequency of aircraft disturbance, when many equation terms may be neglected (or at time now basis) Equation 4 simplifies to:

(5) $$\frac{\ddot{\theta}}{E'} = KTM\delta_e = K'$$

where $T$ is a constant, to maintain constant control authority of the aircraft at such high frequencies.

Further, the constant $K'$ could be selectively set such that the system is stable and free of oscillation.

With the quantity $(T)$ a constant, and with the elevator effectiveness $(M\delta_e)$ varying with various flight conditions such as airspeed or altitude, in order to preserve the constant control authority between $$\frac{\ddot{\theta}}{E'}$$

the quantity $K$ denoting the gain of the amplifier must be varied. A discriminating criteria or constant control authority for adjusting the gain $K$ could be as follows:

$$|K'E'| - |\dot{\theta}| = \xi = 0, \text{ equilibrium}$$

where:
$\xi = +$, increase gain
$\xi = -$, decrease gain

Based on the above criteria, a system could be mechanized in FIGURE 2. However, before discussing the arrangement of FIGURE 2, it is evident from the above mathematical expression that whereas the system operated at the critical gain in the prior patent of Lee and Ljungwe, and in the Bretoi patent, in the present arrangement, as distinct from the control of the prior patents, the control herein from (5) operates below the critical gain, namely a fixed percentage of the critical gain. This percentage can be varied but is preferably kept within six decibels of maximum gain at all times.

Analytical studies of the Bretoi patent have shown that no significant reduction in bandwidth occurs as long as the loop gain remains within 6 to 8 decibels of critical gain. This means that no noticeable change in system performance can be detected as long as the loop gain remains within approximately 40 to 50 percent of its maximum value. Thus it is possible to retain the excellent performance characteristics of the Bretoi system without the requirement for a "forced" limit cycle if some other means for establishing a fixed percentage of critical gain is feasible.

The constant control authority system gain is determined by the outputs of its up and down logic circuits. These logic circuits comprise band-pass networks which measure specific system performance characteristics in certain frequency ranges such as 5–50 radians/sec. for one craft. Equilibrium system gain is obtained when the average outputs of the up and down logics are balanced. CCA can operate at specified fixed percentages of critical gain by proper selection of the relative gains of the up and down logic circuits. In other words, CCA will operate and maintain any desired "gain margin" throughout the flight regime dependent only on the settings of the logic gains. By increasing the gain of the up logic and decreasing the gain of the down logic, the system may be made to operate closer to the critical gain.

For an adaptive system of the type to be acceptable, it must be able to evaluate itself properly when subjected to command inputs only (no gust disturbance) and when subjected to random atmospheric disturbance only (no command). In the following discussion it is shown that CCA can fulfill these requirements separately. Since the system is linear under equilibrium conditions, it is concluded that satisfactory operation can be achieved in the presence of both requirements.

In the control system of FIGURE 2 as in FIGURE 1, the output from a model 10 is summed or combined with the response of a rate gyro 12 sensing pitch rate, for example, of an aircraft. The difference between gyro and model outputs is applied to a system logic network 14 having the transfer function $$\frac{K(Ts+1)}{KTs+1}$$

The output $E'$ of the network is supplied to a modified variable gain amplifier 16 that in turn controls a proportional plus integral servo 20 that positions the control surface, such as the elevator surface of an aircraft 20. The aircraft in response to the displaced surface has imparted to it an angular acceleration $\ddot{\theta}$ and an angular rate $\dot{\theta}$, the latter being sensed by the rate gyroscope 12.

The system includes a novel amplifier gain changer 23 functioning as follows. The aircraft angular acceleration, of positive or negative value, appearing on conductor 24 is applied to a band pass network 25 and thereafter is converted to an absolute quantity through a device such as a rectifier 26. Additionally, the output $E'$ from the network 14 is supplied over conductor 27 to a gain device and band pass network 28. The output from gain device 28 is supplied by conductor 30 to a rectifier 31 and is thereby converted to an absolute quantity. The two absolute quantities on conductors 32, 33 are summed algebraically at point 34. The sum in turn is transmitted in parallel, in one case, through conductor 35 and a dead spot device 36 insensitive to small signals and an integrator 38 to a further summing point 40, and additionally the sum is transmitted through a device 43 such as a linear amplifier having a gain $K_1$ to the further summing point 40. The output from the integrator 38 and from the gain device 43 is summed at the further summing point 40 and is thence applied to the modified variable gain servo control amplifier 16 to adjust the gain thereof or control its output in accordance with the expression above, to maintain constant control authority on the aircraft response. In the above $(+)$ signifies increase gain or up logic on 32. Thus, the variable gain servo amplifier 16 is operated by the output of the gain constant control authority computer 23 which includes two separate paths. The high gain proportional path through $K_1$ is to provide authoritative control over all the instantaneous aircraft pitch acceleration, whereas the low gain integrating path through integrator $$\frac{1}{s}$$

provides a shifting bias for varying steady state gain or static gain. As stated, a dead spot is included in the device 36 supplying the integrator to prevent the integrator from integrating small errors and node shifts. Both band pass networks 25, 28 have adjustable gain provisions to vary their relative outputs, and both pass a frequency spectrum that includes the limit cycle frequency.

In the arrangement of my prior patent with Anders Ljungwe, the adaptive system was subject to a limit cycle due to the high gain at low error signal values. This high gain was at or in the vicinity of the critical gain, consequently, the system had a residual oscillation or limit cycle. In the present arrangement, the amplifier gain (K) is maintained below the critical value consequently the system does not appreciably oscillate for even small error inputs E'.

The arrangement may be mechanized by utilizing the system arrangement of the aforesaid Bretoi patent but substituting for gain changing elements 58, 59, 61, 62, 63, 64 and 65 of FIGURE 2 therein, a novel gain changing computer, shown in block in FIGURE 2 herein, for the servo variable gain amplifier 16. Thus the apparatus of FIGURE 3 herein is similar to that of FIGURE 5 of Bretoi except for the difference in gain changers and controlling the craft in pitch rather than in roll.

The system functional arrangement of FIGURE 2 is again shown in FIGURE 3 with an amplifier 53 however shown in electrical schematic form. The system of FIGURE 3 corresponds substantially to that of FIGURE 5 in the prior Patent 3,057,784 of Remus N. Bretoi. The system of FIGURE 3 comprises a signal providing control section 50, a signal modification section 52, and a utilization section 54. Section 52 comprises an amplifiers 53 which includes a diode modulator 60, an amplifier section 70, a discriminator section 71, and a limiter 80. Diode modulator 60 includes a transformer 61 having a primary winding 62 energized from a suitable A.C. source supplying for example 3.5 kc. voltage thereto. The transformer includes a secondary winding 63 connected to two diode bridges in parallel. On the output side of the diode modulator there is arranged a transformer 65 having a primary winding 64 connected to the diode bridges and with a center tap receiving the D.C. control signal voltages through a conductor 67 from the D.C. control signal source 50.

In the present arrangement, the D.C. control signals are obtained from a summing differential 11 which combines the output of model 10 and the pitch rate gyroscope 12 rather than the output of a model and the roll rate gyroscope as in the aforesaid Bretoi patent. Since the arrangement herein is used in the pitch axis, the transfer function of model 10 will be that of a second order device which transfer function is well known in the art. Also since the present arrangement is electrical in nature, the arrangement in model 10 for providing a second order response may be a suitable electrical network.

Returning to details of section 52, transformer 65 includes a secondary winding 66 which receives the modulated D.C. control signal and amplifies the same through a suitable transistor arrangement. The output of the amplifier section 70 is applied to a primary winding of a transformer 72 which has its output coupled through the transformer secondary 73 to the amplifier discriminator section 71.

Included in the discriminator section 71 are a pair of transformers 74, 75. Transformer 75 has its primary winding energized from an A.C. signal source through conductors 78, 79 extending therefrom. The freqeuncy of this voltage like that applied to primary winding 62 is 3.5 kc. The discriminator amplifier 71 is arranged to provide a D.C. output on conductor 77 which in turn is supplied to a limiter 80 so that the maximum utilized output of the discriminator amplifier is approximately 10 volts. Thus the amplifier 53 may be considered nonlinear through the action of the limiter since despite large input signals on conductor 67 there will be a limited output through limiter 80. However, for small signals, the output from the limiter 80 is linear as indicated by an input-output graph immediately herebelow.

The diode limiter 80 is of a conventional arrangement and has D.C. control voltages of +20, —20 volts applied to opposite sides thereof. The output from the limiter 80 is supplied to a conductor 81 which in turn is connected to the variable gain changer 82.

The gain changer arrangement 82 comprises a diode bridge arrangement 83, a Zener diode 84, a transformer 85, diodes 100, 101 and a resistor 102. The transformer 85 comprises a primary winding 86 which is energized from the novel constant control authority computer 23 to be more fully described hereinafter. As in the aforesaid Bretoi patent, the output from the gain computer which is the constant control authority herein has its voltage applied to transformer winding 86. This voltage is square wave in shape with alternate positive and negative half cycles with the width of each square wave half cycle being modulated between full width and zero width when necessary to provide the constant control authority.

Transformer 85 includes a secondary winding 87 having one end connected through diode 100 and resistor 102 in series, to one side of the diode bridge 83. The opposite end of winding 87 is connected through second diode 101 and resistor 102 in series to the same side of the diode bridge 83. The opposite side of the bridge 83 is connected through a Zener diode 84 to a center tap of secondary winding 87. By the above arrangement of the diodes 100, 101, the D.C. voltage at device 40 FIGURE 2 for example which had been converted to an A.C. output supplying transformer winding 86 is again converted to a D.C. voltage.

Regarding the characteristics of the elements of the gain changer 82, the breakdown voltage of the Zener diode 84 is approximately 28 volts and greater than the breakdown voltage of the diodes in diode bridge 83. The amplitude of the voltage supplied to transformer winding 86 is approximately 40 volts and the width of each voltage pulse in winding 86 is in accordance with the magnitude of the D.C. input signal at device 40, FIGURE 2.

Considering the operation from section 52 through the current limiter 80, for small input signals into the diode modulator section 60 from input conductor 67 there will be on conductor 81 a small average output. As the magnitude of the D.C. control signal on conductor 67 increases the output voltage on conductor 81 increases in accordance therewith. In other words there is a linear variation. However, when the input signal on conductor 67 attains a predetermined magnitude, a full D.C. output voltage of ten volts appears on conductor 81. If the signal on conductor 67 thereafter increases additionally in magnitude there is no additional increase in the voltage on conductor 81.

With respect to the operation of the gain changer 82, if the square wave input to transformer winding 86 is of full width as indicated by the wave symbol in FIGURE 3, the output on conductor 104 will be that on conductor 81. If the square wave has half cycle waves of less than full width as represented by the wave symbol to transformer 85, FIGURE 4B, the average output on conductor 104 with respect to the voltage on conductor 81 varies as the ratio of the actual square wave pulse width to full wave pulse width.

The D.C. output voltage on conductor 104 in turn is supplied to a second amplifier 112 which differentially energizes in known manner a pair of operating windings that control the displacement of a control valve of a hydraulic servomotor 113 in servo means 20. Servomotor 113 in turn operates an actuator 114 that positions the elevator control surface 115 in the aircraft 22.

The output from the servomotor 113 representing the displacement of the servomotor is supplied through a feedback connection 117 to the input side of the amplifier 112. In order to provide a proportional plus integral effect of servo means 20, the feedback arrangement 117 may include a capacitor 118 which provides a high-pass feedback or discontinuous feedback. Functionwise the capacitor 118 causes the servomotor 113 to act as an integrator at low frequencies and as a proportional control at high frequencies and thus a proportional plus integral control is provided by the above feedback provisions.

In some instances where it may be desired to apply a phase shift or rate effect to the output of the summing device 11, FIGURE 3, a lag device 107 is provided in the feedback loop of amplifier 71 whereby the output on conductor 77 is transmitted through the subconductor 106 to lag network 107 which is connected through a summing resistor 110 to a further summing point or summing differential 69. In the present arrangement, the lag device is of the resistor-capacitor type having a resistor 108 and a capacitor 109 connected in series to ground with the terminal of resistor 108 and capacitor 109 being in turn connected to summing resistor 110.

Reference is now made to FIGURES 4A and 4B illustrating one mechanization of a gain computer for obtaining the novel function of constant control authority.

In FIGURES 4A and 4B there is provided an electronic schematic of a computer arrangement for providing constant control authority by operating a gain changer of the type shown in FIGURE 3. The arrangement of FIGURES 4A and 4B has a transformer output connected to the primary winding 86 of FIGURE 3. The arrangement in FIGURES 4A and 4B comprises a multi-stage linear amplifier 120, a second multi-stage linear amplifier 130, a magnetic-transistor integrator amplifier 140, and a magnetic amplifier 150 which supplies an output to the transformer primary winding 86.

Amplifier 120 is of the transistor type having its maximum output band width centered at about four cycles per second. Control signals to the amplifier are supplied through the conductor 27 to the input side of the amplifier. The amplifier includes D.C. power connections 125, 126, an output connection 127 and signal ground connections 128, 129. For a proper phasing, the control signal on conductor 27 is supplied to a lag network 121. The output side of network 121 is connected to the base of an NPN transistor. A second proportional plus derivative network 122 is connected between the transistor collector and base. A third network 123 which is a rate circuit, extends from the collector of the first transistor to a base of a second NPN transistor, thence through straight amplification to provide an output on 127 which may be varied by a gain control 124.

Linear amplifier 130 receives pitch rate signals from the pitch rate gyroscope 12. In order to provide angular acceleration signals $\dot{\theta}$ indicated in FIGURE 2, the pitch rate signal is applied to a rate network 131 extending to a base of a NPN transistor. Between the transistor collector and base is a further passive network 132. Similar to the arrangement in amplifier 120, a rate network 133 extends from the collector of the first transistor to the base of a second transistor of the NPN type and thence through straight amplification to provide an output on conductor 136 that may be varied by a gain control 139. Amplifier 130 includes conductors 134, 135 connected respectively to −40 and +40 sources of D.C. voltage. The amplifier includes signal ground conductors 137, 138 and the output conductor 136. The gain adjustments are used to cause the apparatus to operate near the instability point but without the limit cycle oscillation.

Magnetic-transistor integrator amplifier 140 receives input control signals on conductor 141 through a transformer or inductor arrangement having its opposite side connected to signal ground 142. The magnetic section of the integrator amplifier is supplied with A.C. voltage from a transformer 143, and the output of this section is supplied to a transistor section, the output being applied to the base of a first transistor of a PNP type, The emitter is connected through a conductor 144 to a −20 volt source and the collector through a conductor 147 is connected to a +20 volt D.C. source. Positive 40 volts and negative 40 volts are supplied through conductors 145, 146 to the emitter and base of a NPN transistor having its emitter additionally connected in feedback relation through a capacitor 164 and conductor 148 to the input conductor 141. The collector of the final transistor supplies the output from the integrator amplifier 140 to a conductor 149 which is connected to the input of the magnetic amplifier 150, through a further conductor 153 thereof. Additional inputs to magnetic amplifier 150 are supplied from amplifier 120 by the conductor 127 through a rate network 151 and from amplifier 130 through conductor 136 through a second rate network 152, networks 151 and 152 being similar.

A limiter 159 of the diode bridge type and having its opposite sides connected by conductors 157, 158 to positive 20 and negative 20 volt sources limits the output of the magnetic amplifier 150. The output from amplifier 150 appears on conductor 162 and is supplied through input conductor 141 to the integrating amplifier 140. The integrating amplifier 140 thus provides the integration $$\frac{1}{s}$$

denoted by device 38 of FIGURE 2. The amplifier 150 includes a power connection 154 energized from a 3.5 kc. voltage supply and a ground connection 155. The A.C. output from the magnetic amplifier 150 is square wave in nature, and it consists of alternate positive and negative half wave signals which through conductors 160, 161 are supplied to the winding 86 of transformer 85 of FIGURE 3.

By means of the summing effect in magnetic amplifier 150 of its control signals, a result corresponding to the absolute quantities on conductors 32, 33 FIGURE 2 is obtained.

With respect to the functions of FIGURE 2, there has been described in detail in FIGURES 4A and 4B an arrangement for obtaining the effect through the integrator device 38 and it is clear that a similar effect through the gain device 43 FIGURE 2 may be provided to supply this proportional positive quantity to device 40 FIGURE 2. The effect is achieved by a resistor in parallel with capacitor 164 in FIGURE 4B. Thus the combined effects from devices 38 and through devices 38 and 43 is utilized to energize the transformer winding 86 of FIGURE 3.

It will now be evident that the angular accelerations of the aircraft in response to elevator deflection arising from an input control signal E′ is utilized in connection with such control signal through a gain computer 23 having gain adjustments 124, 139 to modify the gain on servo amplifier 16 at the critical frequency to maintain a constant ratio between aircraft acceleration and amplifier control signal, and that a selected percentage of the critical gain may be maintained.

While the invention has been described as being utilized in the pitch axis of an aircraft, it is equally applicable to either the roll axis or the yaw axis of an aircraft. Thus since many changes can be made in the above construction and many apparently widely different embodiments of this invention could be made without departing from the scope thereof, it is intended that all matter contained in the above description or shown in the accompanying drawings shall be interpreted as illustrative and not in a limiting sense of the invention.

What is claimed is:

1. In control apparatus for an aircraft having a control surface for applying a control moment about an axis of the craft, a model having an output representing the desired response of the aircraft to the input control; a rate gyroscope sensing actual aircraft pitch rate and having an output; first means combining the model and gyroscope outputs to derive an amplifier control signal; a variable gain linear amplifier responsive to said control signal; a servomotor operated by said amplifier and operating said control surface; computer means for adjusting the gain of the amplifier including second means providing a craft angular acceleration signal, third means modifying said amplifier control signal, summing means responsive to the second and third means to provide an output, and fifth means adjusting to the amplifier gain from the summing means to maintain constant the ratio of angular acceleration and amplifier control signal.

2. In control apparatus for an aircraft having a control surface means whereby a control moment may be applied about an axis of the craft, in combination: a model simulating an ideal aircraft as to natural frequency and damping ratio having an output signal representing the desired response or standard of performance of the craft to an input control; a rate gyroscope sensing aircraft angular rate and having an output signal; first means providing an angular acceleration signal; further means combining the model and gyroscope signals to derive a control signal; a variable gain linear amplifier responsive to said control signal and providing an output whereby said control surface means may be operated; and additional means controlled by the first and further means adjusting the gain of the linear amplifier to maintain substantially constant the ratio of craft angular acceleration to said amplifier control signal.

3. In control apparatus for an aircraft having attitude changing means for applying a control moment about an axis of the craft, in combination: a model simulating an aircraft as to damping ratio and having an output signal representing the desired response or standard of performance of the craft to an input control; an angular rate signal providing device; further means combining the model output signal and rate signal to derive a control signal; a variable gain amplifier responsive to said control signal and providing an output in accordance with which said attitude changing means may be operated; adjustable means providing the craft angular acceleration signal; further signal responsive means electrically in parallel with said amplifier and modifying said control signal; summing means responsive to the adjustable means providing the acceleration signal and the further signal responsive means and adjusting the gain of the amplifier to maintain substantially constant at high frequency the ratio of aircraft angular acceleration signal to control signal.

4. In a position control system for an aircraft having a controlling element providing a control signal, a controlled element such as an elevator surface of a craft, and means for positioning said controlled element, in combination: means responsive to said control signal for energizing said positioning means; craft angular acceleration signal providing means and means for varying the gain of said energizing means and responsive to the magnitude of said control signal and the angular acceleration signal of the craft to maintain substantially constant the ratio between said control signal and the angular acceleration signal.

5. In a control apparatus for an aircraft having attitude changing means, in combination: a controlling element comprising a model simulating an aircraft as to natural frequency in response to an input signal thereto, providing an output signal indicative of a desired response of the aircraft, servo means positioning said attitude changing means; a variable gain amplifier controlling said servo means and having its operation initiated by the output signal of the model; third means providing a signal, in response of the craft to the change in position of the attitude changing means, to said amplifier opposing said model output signal to provide an outer loop control of the amplifier; and an inner loop comprising a selected variable output computer means for varying the gain of the amplifier and responsive to the model output signal and a signal from said third means in accordance with the response of the aircraft to operation of said attitude changing means.

6. In an aircraft flight control system having an elevator surface for controlling pitch attitude, and servo means operating said elevator, in combination: signal means including a model simulating an aircraft as to natural frequency to provide an output signal indicative of the desired response of the combined control system and craft; a variable gain amplifier connected to said signal means and having its operation initiated thereby and controlling said servo means so that the servo means has a displacement which is the linear-integral function of the output signal of the signal means; flight condition responsive signal providing means; and computer means responsive to said output signal of the signal means and to the signal due to the flight condition of the craft resulting from operation of said surface adjusting the gain of the amplifier in accordance with the integral of the difference of the signals of the signal means and responsive means.

7. The apparatus of claim 6, wherein said computer means includes a gain selector of one of the two signals supplied thereto by which the amplifier gain may be selected so that the craft is controlled by the servo means as to have a response to the signal means output signal that is a desired percentage portion of that response causing oscillation of the craft at the critical frequency of the combined control system and craft.

8. In an elevator position control apparatus for an aircraft, a first aircraft control loop comprising a first controlling means comprising a model simulating an aircraft as to desired operating characteristics providing a signal representing the desired craft response; a device responsive to the angular rate of the craft; servo means positioning said control surface; a variable gain amplifier supplied with the signal from the model by said first controlling means to thereby provide an output controlling said servo means; a second loop comprising gain changing means for said amplifier modifying the ratio of the signal to the amplifier and the output therefrom including computer means responsive to said first means also and to a function of the angular rate of the craft for maintaining substantially constant the ratio between the output of the first controlling means and said function of angular rate.

9. The apparatus of claim 8, characterized by said computer means including a selective gain adjustment whereby the gain of the apparatus may be a selected percentage or proportion of the gain at the critical frequency of the combined control apparatus-aircraft which would cause continued oscillations of the craft.

10. In an aircraft control surface positioning system, having servo means for positioning said surface, in combination: a variable gain amplifier operating said servo; means including a model simulating an ideal aircraft as to natural frequency and damping ratio and providing a continuous signal indicative of a desired aircraft response to such signal and supplied as an input for operating said amplifier; and means for adjusting the gain of the amplifier to alter the effect of the continuous signal on said amplifier and controlled by the magnitude of the input to the amplifier and the response of the craft due to adjustment of said control surface.

11. In condition control apparatus having a condition changing means, in combination: a model simulating an ideal apparatus as to operating conditions and having an output signal representing the desired response function of the apparatus to the change of the condition; a condition change rate signal providing device; further means combining the signal from the model and the rate device to provide a control signal; a variable gain linear amplifier having as its input said control signal; a servomotor operated by said amplifier and positioning said condition changing means to provide an outer loop controlling the condition; additional means forming an inner loop including means adjusting the gain of the amplifier responsive to a second function of the condition and the control signal.

12. In control apparatus for an aircraft, a craft control loop comprising means supplying a command signal; a model simulating an aircraft as to natural frequency receiving said command signal and supplying a control signal; an amplifier responsive to said control signal; a servomotor operated by said amplifier and positioning attitude changing means on the craft, the effectiveness of the attitude changing means varying with flight conditions; a gain control loop for the craft control loop comprising further means providing a signal in accordance with the angular acceleration response of the craft to the positioning of the attitude changing means; and means combining the further means acceleration signal and the control signal from the model and modifying the effect on the amplifier of the magnitude of the model control signal.

13. The apparatus of claim 12, means responsive to the angular rate of the craft; and means for modifying the control signal from the model supplied to the craft control loop and to the gain control loop by said rate responsive means.

14. In control apparatus for craft having a control surface for controlling attitude thereof, a surface control loop comprising a model defining the desired operating characteristics of the apparatus and craft together supplying a control signal, a servo amplifier responsive to said control signal, a servo motor operated by said amplifier to position the control surface, further means providing a signal in accordance with response of the craft to the positioning of the control surface, a gain control loop for the surface control loop for modifying the effect on the amplifier of the model control signal comprising means filtering and converting said control signal and the signal from the further means, means for algebraically combining said filtered signals, means for integrating the algebraic sum and adjusting the gain loop whereby the gain is increased if the signal from the control model be greater than that from the further means and reduced when the signal from the model is less than that from the further means.

15. In control apparatus for an aircraft having a control surface such as an elevator which applies a moment to the craft and which effective moment varies with flight conditions of the aircraft, a surface operating control loop comprising a model, defining the desired operating characteristics of the control apparatus and craft together, supplying a control signal; an amplifier responsive to said control signal; a servo motor operated by said amplifier to position the control surface; a gain control loop modifying the effect on the amplifier of the magnitude of the model control signal comprising further means providing a signal in accordance with the response of the craft to the moment of the control surface, means for converting both the model signal and the signal from the further means to absolute quantities, means for combining algebraically said absolute quantities, and integrating servo controlled by the combining means and varying the gain control loop whereby when the model signal is less than the signal from the further means the gain is increased.

References Cited in the file of this patent

UNITED STATES PATENTS 2,948,494    Curry _____ Aug. 9, 1960

FOREIGN PATENTS 624,201    Great Britain _____ May 30, 1949